Patented Nov. 3, 1936

2,059,512

UNITED STATES PATENT OFFICE 2,059,512

MONOAZODYESTUFFS

Richard Fleischhauer, Frankfort-on-the-Main-Fechenheim, Germany, assignor to General Aniline Works, Inc., New York, N. Y., a corporation of Delaware No Drawing. Application June 14, 1935, Serial No. 26,699. In Germany June 26, 1934

4 Claims. (Cl. 260—92)

My invention relates to monoazodyestuffs of the general formula:

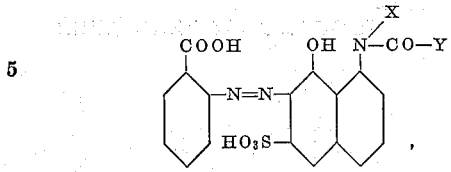

wherein X means hydrogen or alkyl, Y an aliphatic or phenyl radicle. They are obtained by combining diazocompounds of o-aminobenzoic acid or its substitution products with 1-acylamino-8-naphthol-6-sulphonic acids or their N-substitution products.

The dyestuffs thus obtained dye wool and silk pure scarlet to bluish red shades of a good levelling power and very good fastness to light. Compared with analogous dyestuffs the dyestuffs of the present invention are distinguished by a more yellowish shade and an increased fastness to light.

In order to further illustrate my invention the following example is given, the parts being by weight and all temperatures in centigrade degrees. I wish it however to be understood that my invention is not limited to the particular products nor reaction conditions mentioned therein.

Example

The diazocompound of 13.7 parts of 2-aminobenzoic acid is combined with a solution of 28.5 parts of 1-acetylamino-8-naphthol-6-sulfonic acid in the presence of an excess of sodium bicarbonate. The dyestuff formed of the formula:

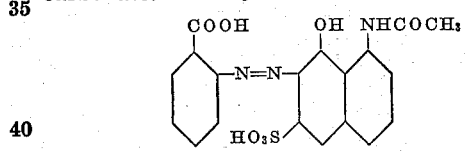

is, when dry, a red, water soluble powder and dyes wool from an acid bath very level bright red shades of very good fastness to light.

Similar dyestuffs of likewise bright scarlet to bluish red shades are obtained by using as diazo component the diazo compound of 4- or 5-chloro-2-aminobenzoic acid, of brom-aminobenzoic acid, of 4- or 5-nitro-2-aminobenzoic acid, 4- or 5-acylamino-2-aminobenzoic acid, or 2-aminobenzoic acid methylester, and by using as combining component N-substitution products of the 1-amino-8-naphthol-6-sulfonic acid, in the molecule of which a methoxy-acetyl-, phenoxyacetyl-, chloroacetyl-, benzoyl-, substituted benzoyl or toluene-sulfonic acid radicle is attached at the nitrogen atom.

Particularly valuable are the dyestuffs of the following formulae:

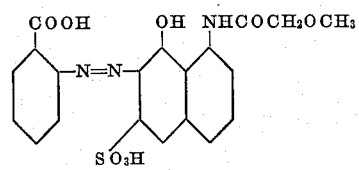

which dyestuff is when dry a red water soluble powder and dyes wool very bright and level red shades of a very good fastness to light, and

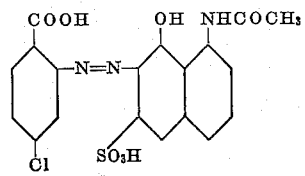

which dyestuff dyes wool bright scarlet shades fast to light and

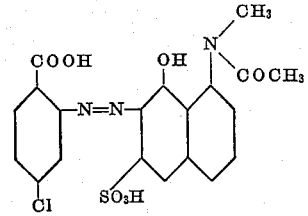

which dyestuff dyes wool bright and level red shades, fast to light, and

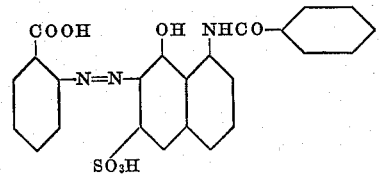

which dyestuff dyes wool bright and level bluish red shades, fast to light.

I claim:
1. Monoazodyestuffs of the general formula:

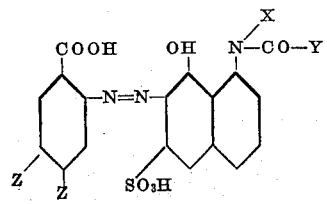

wherein X means a member of the group consisting of hydrogen and alkyl, Y a member of the group consisting of aliphatic and phenyl radicals, one Z stands for hydrogen and the other Z is selected from the group consisting of hydrogen, halogen, nitro and acylamino groups, which dyestuffs dye wool and silk pure scarlet to bluish red shades of a good levelling power and very good fastness to light.

2. The monoazo dyestuff of the formula:

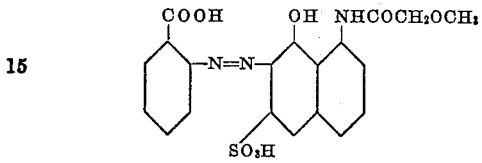

which dyestuff is when dry a red water soluble powder and dyes wool very bright and level red shades of a very good fastness to light.

3. The monoazo dyestuff of the formula:

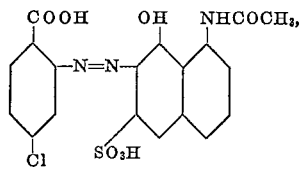

which dyestuff dyes wool bright scarlet shades fast to light.

4. The monoazo dyestuff of the formula:

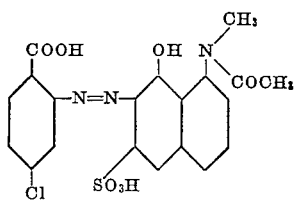

which dyestuff dyes wool bright and level red shades, fast to light.

RICHARD FLEISCHHAUER.